United States Patent [19]

Potts et al.

[11] Patent Number: 5,162,431
[45] Date of Patent: Nov. 10, 1992

[54] POLYMERIC COMPOUNDS HAVING URETHANE AND SULFONATE GROUPS

[75] Inventors: Rodney M. Potts; Terence Etherington; Jianrong Ren, all of Leeds, United Kingdom

[73] Assignee: Du Pont-Howson Limited, Leeds, United Kingdom

[21] Appl. No.: 650,488

[22] Filed: Feb. 5, 1991

[30] Foreign Application Priority Data

Feb. 13, 1990 [GB] United Kingdom ............... 9003192

[51] Int. Cl.$^5$ .............................................. C08F 08/00
[52] U.S. Cl. ..................................... 525/61; 525/123; 525/353; 525/452; 525/460; 525/480; 525/528; 525/534
[58] Field of Search ................. 525/123, 61, 353, 460, 525/452, 528, 534, 480

[56] References Cited

U.S. PATENT DOCUMENTS 4,770,804 9/1988 Hentschel et al. ................... 524/591
5,120,799 6/1992 Wade et al. ......................... 525/353

Primary Examiner—Maurice J. Welsh
Assistant Examiner—Rachel Johnson
Attorney, Agent, or Firm—Harness, Dickey & Pierce

[57] ABSTRACT

A polymeric compound is derived from a polyhydric material and has pendant sulphonate groups of the general formula

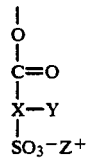

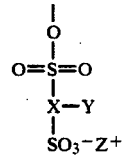

and pendant alkyl urethane groups of the formula

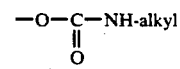

where X is an aliphatic, aromatic, carboxylic or heterocyclic group; Y is hydrogen, halogen or an alkyl, aryl, alkoxy, aryloxy or aralkyl group, $CO_2^-Z^+$, $CO_2R$ or $SO_3^-Z^+$; $Z^+$ is a cationic counter ion and R is hydrogen alkyl, alkylene, aryl or aralkyl group.

13 Claims, No Drawings

POLYMERIC COMPOUNDS HAVING URETHANE AND SULFONATE GROUPS

This invention relates to novel polymeric compounds and more particularly, but not exclusively, is concerned with such compounds suitable for use as binder resins in radiation-sensitive compositions for coatings in printing plate production or photoresists.

In use, such radiation sensitive compositions are coated on a suitable substrate and image-wise exposed to radiation so that parts of the composition are struck by the radiation and parts are not. The radiation-struck and non-radiation-struck parts have differing solubilities in developer liquids and thus the more soluble parts can be selectively removed by applications of such a liquid to leave an image on the substrate constituted by the less soluble parts. For environmental and health reasons there has been an increasing tendency for wholly aqueous or substantially aqueous based solutions, rather than organic solvents, to be used as the developer liquids. In addition, for environmental, health, and practical reasons it is also desirable to use neutral or mildly alkaline developer liquids rather than strongly alkaline developers. For example where high developer pH is pre-requisite for adequate development, reduction in pH can occur rapidly in automatic processors due to neutralization by dissolution of acidic radiation sensitive coating components and due, particularly, to absorption of carbon dioxide from the atmosphere hence rendering the developer inactive or 'exhausted'. It is thus desirable to provide radiation sensitive compositions which exhibit excellent developability at low coating acidity and which require neutral or only mildly alkaline developers and hence give significantly extended developer life. For such solutions to be effective, the radiation-sensitive compositions must be soluble, or at least swellable, in such solutions. Binder resins formed by providing polyhydric material with pendant sulphonic acid groups, as distinct from pendant carboxylic acid groups, are valued because the highly ionic nature of the sulphonic acid promotes aqueous developability, even at low acid values. However, when these polysulphonate binder resins are used with diazo resins, this same ionic nature causes a strong interaction between the sulphonic acid (anionic) and diazonium (cationic) groups and, since both materials are polyfunctional, precipitation problems can arise during coating solution make up and storage. This potential incompatibility, which is dependent upon the actual acid value of the polysulphonate binder resin, reduces the possible range of diazo resin: polysulphonate binder resin ratios which can be used in particular coating solvent mixtures. The higher the acid value, the lower the level of diazo which can be successfully employed in the coating solution. Higher acid values can also give an undesirable reduction in oleophilicity although they do confer optimum developability, particularly with mildly alkaline, low surfactant aqueous developers.

It has been found that the incorporation of fatty groups (e.g. alkyl chains) into the polysulphonate binder resin not only gives desirable increases in the oleophilicity of the radiation sensitive compositions into which the binder is incorporated, but also, where the binder is used in a diazo-based system, unexpectedly, improves the compatibility between diazo resins and the binder resin, without impairing developability.

The fatty chains can be introduced into the support resin through carboxylic ester linkages or alternatively through sulphonic acid ester linkages, but manufacture and subsequent aqueous processing of the so-derived binder resins become progressively more difficult as the carbon chain length extends beyond about ten. The processing difficulties arise because all the conventional reactive species which might be used to form a carboxylic acid ester or a sulphonic acid ester, will also form a certain amount of the free acid as a by-product or contaminant. Carboxylic acids having more than ten carbon atoms have only a limited solubility in the water or dilute alkali normally used for isolation of the binder resin and hence the isolated resin almost inevitably contains a significant proportion of free carboxylic acid. This free acid is carried through all subsequent processing steps, even into the finished coating, where its presence is undesirable as it may cause a shortfall in run length. Free sulphonic acids (having more than ten carbons in the chain) are to some extent more readily solubilised than equivalent carboxylic acids but then further operational difficulties are experienced because the free acid acts as a surfactant and severe foaming occurs during the high shear stirring which must be employed to isolate the binder resin.

It is an object of the present invention to provide a sulphonic acid group-containing polymeric compound for use as a binder resin which is free of the above disadvantages.

It has now been found, unexpectedly, that improved polysulphonate binder resins (having the desired properties of greater diazo resin compatibility and increased oleophilicity for a given acid value) can be manufactured and isolated, in a form which is essentially free of monomeric contaminants, by reacting alkyl isocyanates (particularly higher alkyl isocyanates) with hydroxyl groups of the polyhydric material.

Accordingly one aspect of the present invention provides a polymeric compound derived from a polyhydric material which compound comprises a plurality of substituent sulphonate groups attached to carbon atoms of the polyhydric material and a plurality of substituent urethane groups of the formula

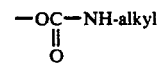

attached to carbon atoms of the polyhydric material.

The sulphonate groups may be of the general formula

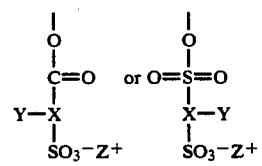

where X is an aliphatic, aromatic, carbocyclic or heterocyclic group; Y is hydrogen, halogen, or an alkyl, aryl, alkoxy, aryloxy or aralkyl group, $CO_2^- Z^+$, $CO_2 R$ or $SO_3^- Z^+$; $Z^+$ is a cationic counter-ion and R is hydrogen or an alkyl, alkylene, aryl or aralkyl group.

In an embodiment of the invention the sulphonate groups may be derived from sulphonato substituted acids of the formula

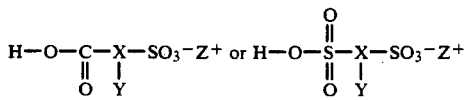

where X, Y, Z+ and R have the meanings specified above.

In another embodiment of the invention the sulphonate groups may be derived from a reactive derivative of a carboxylic or sulphonic acid. Suitable derivatives are, for example, acid chlorides or anhydrides.

The urethane groups are provided by reacting the polyhydric material with an alkyl isocyanate and manufacture of the binder resins is simplified because the isocyanate reaction can be performed either before or after incorporation of the sulphonic groups. Also isocyanate groups are very selective in their reactivity towards hydroxyl groups and virtually no reaction with sulphonic acid groups will occur under normal conditions. This selectively is not necessarily matched by, e.g. carboxylic acid chloride groups, which could react with any sulphonic acid groups present in the reaction mixture.

Isolation and purification procedures are simplified since, if the isocyanate reacts with any adventitious water during the intended urethane-forming reaction, the eventual water-isocyanate reaction product is a urea which has only very limited solubility in the solvents commonly used for this reaction. This insolubility is evident with all higher alkyl isocyanates (i.e. greater than $C_{10}$ chain length) and so the optimum chain length can be chosen for plate properties without any increased difficulties in resin manufacture. Suitable solvents for the urethaneforming reaction are N-methylpyrrolidone, tetrahydrofuran and dioxan.

The alkyl isocyanate used to introduce the urethane groups preferably has the formula R'NCO where R' is an alkyl chain containing from 10 to 20 carbon atoms. Particularly preferred alkyl isocyanates include decyl isocyanate, dodecyl isocyanate, hexadecyl isocyanate and octadecyl isocyanate.

According to another aspect of the invention there is provided a process for the production of a polymeric compound which process comprises reacting some hydroxy groups of a polyhydric material with a sulphonato substituted acid of the formula

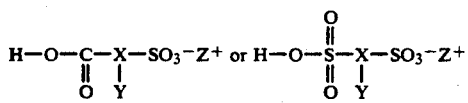

or with an ester forming derivative thereof and reacting other hydroxy groups of the polyhydric material with an alkyl isocyanate of the formula R'NCO to obtain the desired polymeric compound which comprises substituent sulphonate groups of the general formula

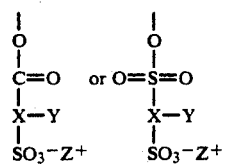

and substituent urethane groups of the formula

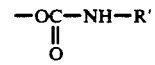

where X, Y, Z+ and R' have the meanings specified above.

If desired the polymeric compound may comprise two or more different counter-ion species, at least one of which species may be radiation sensitive. Subsequent ion exchange of the initial counter-ion of the sulphonic acid groups to alternative preferred cations is facilitated within the process either directly, as part of the polymer isolation procedure or in a subsequent ion-exchange treatment of the previously isolated sulphonic acid derivative. This is particularly desirable where the initial counter-ion is H+.

Examples of suitable sulphonato-substituted acids and derivatives useful for introducing the sulphonate groups are: 2-sulphobenzoic acid cyclic anhydride; 3,4,5,6-tetrabromo-2-sulphobenzoic acid cyclic anhydride; sulphoacetic acid; 2-sulphobenzoic acid; 4-sulphobenzoic acid, 5-sulphoisophthalic acid; 4-sulpho-1,8-naphthalic anhydride; 3-sulpho-2-naphthoic acid; 3-sulphophthalic acid; 4-sulphophthalic acid; 4-sulphon-benzoyl chloride; naphthalene-1,5-disulphonyl chloride; naphthalene-2,6-disulphonyl chloride; benzene-1,3-disulphonyl chloride; anthraquinone-1,5-disulphonyl chloride; 2-sulphobenzene sulphonic acid cyclic anhydride; 3-sulphonaphthalene-8-sulphonic acid cyclic anhydride; 3-sulpho-2-naphthoic acid cyclic anhydride; 3-sulphopropionic acid cyclic anhydride; furan-2-chlorocarbonyl-5-sulphonic acid; and 2-sulphohexadecanoic acid, 2-sulpholauric acid, 2-sulphomyristic acid, 2-sulphostearic acid, 2-sulphobehenic acid and their cyclic anhydrides.

Suitable polyhydric materials include, in particular, polymers having vinyl alcohol units, such as partially saponified polyvinyl esters; polyvinyl acetals having free hydroxy groups and corresponding reaction products derived from copolymers having vinyl ester units or vinyl acetal units or vinyl alcohol units. Also usable are epoxy resins and saponified epoxy resins, copolymers of allyl alcohol or higher molecular weight unsaturated alcohols, hydroxy acrylic polymers, for example poly (hydroxyalkyl) (meth) acrylate polymers, phenolic polymers such as phenol formaldehyde resins and vinyl phenol polymers, and other similar polymers. Polyvinyl acetals are particularly preferred.

The molecular weights of the polysulphonate compounds of the invention can vary over a wide range. Generally, the polysulphonates have average molecular weights in the approximate range between 900 and 200,000 and preferably between 900 and 100,000. The degree of esterification of the polysulphonate products can be quantified in terms of acid-values (AV) where Z+ =H+, or 'acid-value equivalence' (AVE) where Z+ is other than H+, where the acid-value equivalence refers to the acid-value of the polysulphonate (Z+ =H+) prior to ion-exchange. The AVs or AVEs of the polysulphonates vary between 5 and 150, preferably between 10 and 90.

The reactions between the polyhydric material and the sulphonato substituted organic carboxylic acid, acid chloride or acid anhydride or the sulphonato substituted organic sulphonic acid, acid chloride or acid anyhydride are readily achieved and provide very efficient and reproducible esterification processes. This enables polysulphonates of required acid values for particular applications to be prepared readily. Mixed carboxy/sulphonate acids or reactive acid derivatives thereof react with polyhydric materials to form the corresponding carboxy esters. Evidence of this specificity of reaction is provided by V Iyer and N K Mathur; Anal. Chim. Acta., 554, 33. 1965 (2-sulphobenzoic acid cyclic anhydride) and EE Gilbert, 'Sulphonation and Related Compounds', Chapter 5, J Wiley, Interscience, 1965.

The esterification reactions can be carried out in a range of organic solvents for example N-methylpyrrolidone, butanone, tetrahydrofuran, dioxane or other ethers. Basic catalysts, for example tertiary amines or sodium carbonate are generally employed. Alternatively, esterifications undertaken with acid derivatives other than the acid chloride or acid anhydride may be effected with catalysts such as dicyclohexylcarbodiimide.

A particularly preferred polymeric compound in accordance with the present invention is produced by reacting a poly(vinyl butyral) initially with octadecyl isocyanate and subsequently with sulphobenzoic acid cyclic anhydride and has the general structure:

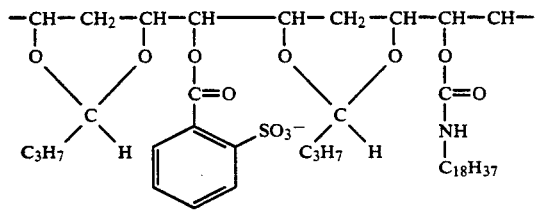

A wide range of cationic species may be employed, either individually or in combination, as the counterions of the poly sulphonate compounds of the invention and, as such, this allows flexibility to obtain polysulphonate compounds having the required coating solubility and the required radiation-sensitive composition characteristics of, for example sensitivity, hydrophobicity, oleophilicity, developability, image colour contrast stability, developer life and press performance.

For example, such properties can be improved by selecting the cations from:

A) Cations which have an active role in the essential radiochemical/photochemical reaction on exposure of the composition to radiation, for example as a photosensitiser, photoinitiator, photoactivator, photocrosslinking agent, photoactive acid-release or base-release compound, photooxidant, and photo solubilisation agent.

B) Cations which have an active role in a radiation induced reaction which results in the generation of solubility differentials, for example as a cleavable compound, solubilizable compound, a crosslinkable compound, a polymerisable component, or which result in the production of a colour change, for example as indicators, dyes, dye precursors and colour formers.

C) Cations which have the role of introducing desired performance characteristics into the radiationsensitive composition for example, polymers, colourants, inhibitors, stabilisers, adhesion promoters, activators, catalysts, surfactants, development aids, oleophilicity enhancers and such like.

Cations may be used individually or in combination to provide the desired radiation sensitive composition characteristics.

Examples of suitable cations which may be used are:
i) Hydrogen
ii) Metals such as sodium, potassium, lithium, magnesium, calcium and silver
iii) Quaternary ammonium compounds such as ammonium ($N^+H_4$), S-benzylthiuronium, trimethylglycidyl ammonium, vinylbenzyltrimethyl ammonium, dimethyldiallyl ammonium, benzylmethyldiallyl ammonium, trimethyl ammonium ethylmethacrylate, 4-azidophenyldiethyl ammonium, 4-benzoylbenzyl-trimethyl ammonium, 3-(9-oxo-9H-thioxanthen-2,3-γ-4-yloxy)-N,N,N-trimethyl -1-propanaminium, benzyldimethylhexadecyl ammonium, benzyldimethyltetradecyl ammonium, benzyltributyl ammonium, benzyltriethyl ammonium, benzyltrimethyl ammonium, dodecylethyldimethyl ammonium, ethylhexadecylmethyl ammonium, hexadecyltrimethyl ammonium, methyltrioctyl ammonium, octadecyltrimethyl ammonium, phenyltrimethyl ammonium, tetrabutyl ammonium, tetradecyltrimethyl ammonium, tetradodecyl ammonium, tetraethyl ammonium, tetraheptyl ammonium, trioctyl ammonium, triethyl ammonium, benzyl ammonium, benzyldimethyl ammonium, hydroxymethylisopropyl ammonium, didodecylmethylethylmethacrylate ammonium, tetrahexyl ammonium, tetramethyl ammonium, tetraoctadecyl ammonium, tetraoctyl ammonium, tetrapentyl ammonium, tetrapropyl ammonium, tributylheptyl ammonium, and tributylmethyl ammonium.

iv) Quaternary-N-heterocyclic compounds such as N-methyl-N-vinylpyridinium, N-hexadecylpyridinium, N-methylquinolinium, N-methylbenzothiazolium, N,4,4-trimethyl-2-oxazolinium, N-methylphenazonium, 4-dimethylaminostyryl pyridinium, 2-azidobenzimidazolium, pyridinium, piperidinium, and morpholinium.

v) Diazo Compounds such as 4-diazodiphenylamine, 4-diazodiphenylamine polycondensates, compounds as disclosed in EP-A 0 233 072, compounds as disclosed in EP-A 0 030 862, and 2,5-diethoxy,4-(4'methylphenyl)benzene diazonium.

vi) Polymeric compounds such as poly co(vinylpyrolidone/vinylimidazolium), poly (5-vinyl-1,2,-dimethylpyridinium), poly (4-vinyl-1methylpyridinium), and poly(2[4'methoxystyryl-] methylpyridinium).

vii) Cationic dyes such as 3,3'-Diethyloxacarbocyanine, Crystal Violet, Malachite Green, Acridine Orange, and Rhodamine 6G.

viii) Other Compounds such as triphenylcarbenium, 2,4,6-tritolylpyrylium, 2-carboethoxy-4,6-diphenylpyrylium, 2-methyl-3-phenylbenzopyrylium, trimethylsulphonium, trimethylsulphoxonium, triphenylsulphonium, diphenyl iodonium, dithienyl iodonium, 2,4,6-triphenyltriapyrylium, 2,5-dimethylbenzdithylium, triphenyl selenonium, nhexadecyltri-n-butylphosphonium, allyltriphenyl phosphonium, cinnamyltriphenyl phosphonium, 9-fluorenyl phosphonium, benzyltriphenyl phosphonium, and 4-benzoylbenzyldimethyl phosphonium.

The above examples represent a small proportion of the cations which may be used as counter-ions for the polysulphonate compounds of the invention. Reference may be made to Review of Light-Sensitive Tetraarylborates by Douglas G. Borden from Photographic Science and Engineering, Vol.16, Number 4, July–August 1972 which further illustrates the range of classes of cations suitable for use.

Ion-exchange reactions can be carried out by a number of methods known to those skilled in the art. Preferred examples include; i) addition of a reagent which provides cation $Z^+$ in the final polysulphonate to the esterification reaction liquors, optionally followed by drown out of those liquors into water, ii) drown out of the esterification liquors into liquors containing a reagent which provides cation $Z^+$, and iii) dispersion of a reagent which provides cation $Z^+$ in a preferred coating solvent followed by addition of the isolated polysulphonate compound with resultant dissolution of the polysulphonate compound after a period of agitation of the coating liquors.

The compounds of the invention may advantageously be incorporated not only into negative-working diazo systems, but also, due to their ability to provide increased oleohilicity without contaminating acid by-products may advantageously be incorporated into a variety of radiation sensitive compositions well known to those skilled in the art, including in particular photopolymerizable systems. Such radiation sensitive compositions are detailed in 'Chemistry for the Graphic Arts' by Paul J. Hartsuch and in 'Light Sensitive Systems' by Jaromir Kosar. In this case, the polysulphonate may be used in simple admixture with the components of the radiation-sensitive composition. In such an application, the primary role of the polysulphonate is that, described by those skilled in the art, of a 'binder' resin or a 'support' resin. Such resins have two principal functions, one of which is to increase the durability and resilience of the composition, which is particularly desirable in printing applications where extended press runs are required, and the other is to provide suitable development properties in preferred developer compositions. As indicated previously, the composition of the compounds of the invention may be designed and selected to impart additionally desired properties to the radiation-sensitive composition such as hydrophobicity, sensitivity, stability and such like. The proportion of polysulphonate compound employed in such radiation sensitive compositions can vary between wide limits depending on the nature of the composition and will generally be from 95 to 5, preferably from 90 to 25, percent by weight of the total coating components.

Alternatively, however, it is also possible to provide radiation sensitive compositions in which radiation sensitive components are introduced, either fully or in part, by using a radiation-sensitive cation, for example, diazo $N_2^+$, azido-quaternary ammonium compounds, cationic cyanine sensitiser dyes, cationic photoinitiators and such like as the counter-ion species of the polysulphonate of the invention as indicated previously (cation group A).

The radiation sensitive compositions of the present invention may also contain additional components known to those skilled in the art to further improve performance, for example dyes, pigments, stabilisers, fillers, surfactants, plasticizers, adhesion promoters and also other resins or polymers.

The following Examples illustrate the invention:

EXAMPLE 1

52.8 Parts by weight of a poly(vinyl butyral) comprising 71% by weight vinyl butyral units, 26% by weight vinyl alcohol units and 3% by weight vinyl acetate units, and having an average molecular weight of about 15,000–17,000 were dissolved in 600 parts by weight of 1-methyl-2-pyrrolidone by heating to 40° C. After cooling to 25° C., 44.2 parts by weight of 2-sulphobenzoic acid cyclic anhydride and 2.5 parts by weight of sodium carbonate were then added and the mixture was maintained for 3 hours at 25° C., while stirring. After cooling to 20° C., the clear solution formed was poured into 10,000 parts by weight of vigorously stirred water containing 100 parts by weight of concentrated hydrochloric acid. The resultant white solid polysulphonate compound was collected on a filter, washed with water in a commercial food processor and dried in vacuo to constant weight. The AV of the product was 46, and the yield was 70 parts by weight.

50 Parts by weight of the above polysulphonate were re-dissolved in 500 parts by weight of 1-methyl-2-pyrrolidone by heating to 40° C. On cooling to 20° C., 25.3 parts by weight of octadecyl isocyanate and 0.2 parts by weight of dibutyl tin dilaurate were added and the mixture was maintained for 24 hours at 25° C., while stirring. A quantitative IR spectrum undertaken at this point showed that the isocyanate reaction had gone to completion. It was apparent at this point in the reaction that a white precipitate had formed. This precipitate was caused by the reaction of the octadecyl isocyanate with residual water. This unwanted by-product was then removed by filtration and the resultant clear polymer solution was poured into 8,000 parts by weight of vigorously stirred water. The resultant white fibrous solid was collected on a filter, washed with water in a commercial food processor and dried in vacuo to constant weight. Subsequent analysis of this dried product showed it to have an AV of 36 and a nitrogen content of 1.04%: this equates to approximately 10 mol % of alkyl urethane.

50 Parts by weight of the above isocyanate modified polysulphonate were slurried in 500 parts by weight of industrial methylated spirit at ambient temperature. To this slurry were added 15.5 parts by weight of benzyl dimethyltetradecylammonium chloride dihydrate, and on stirring at ambient temperature for 2 hours a clear solution was obtained. This clear solution was then poured into 8,000 parts by weight of vigorously stirred water and the resultant white, fibrous solid was collected on a filter, washed with water and dried in vacuo to constant weight.

Analysis showed polymer bound counter-ion to be 16.9% w/w and free counter-ion to be less than 0.1% w/w.

EXAMPLE 2

52.8 Parts by weight of a poly(vinyl butyral) as described in Example 1 were dissolved in 600 parts by weight of 1-methyl-2-pyrrolidone by heating to 40° C. On cooling to 25° C., 44.5 parts by weight of octadecyl isocyanate and 0.2 parts by weight of dibutyl tin dilaurate were added and the mixture was maintained for 24 hours at 25° C., while stirring. A quantitative IR spectrum undertaken at this point showed that the isocyanate reaction had gone to completion. As in Example 1, a white precipitate was formed.

To the above reaction mixture were then added 9.4 parts by weight of 2-sulphobenzoic acid cyclic anhydride and 0.8 parts by weight of sodium carbonate. The mixture was then maintained at 25° C. for 3 hours. After this time, a sample of the reaction mixture was taken, filtered to remove the white precipitate and the resultant clear solution was poured into a large excess of vigorously stirred water. The resultant fibrous solid was collected on a filter, washed well with water in a commercial food processor and dried in vacuo to constant weight. Analysis of this sample showed it to have an AV of 37 and a nitrogen content of 0.99%.

To the bulk of the reaction mix was added 24.8 parts by weight of benzyldimethyltetradecylammonium chloride dihydrate. The reaction mixture was then stirred at 25° C. for 1 hour after which time the mixture was filtered to remove the unwanted white precipitate. The clear solution was then poured into 8,000 parts by weight of vigorously stirred water and the resultant white, fibrous solid was collected on a filter, washed well with water, and dried in vacuo to constant weight. The yield was 73.4 parts by weight.

Analysis showed that this final polymer contained 16.8% w/w bound counter-ion and less than 0.1% free counter-ion.

EXAMPLE 3

52.8 Parts by weight of a poly(vinyl butyral) as described in Example 1 were dissolved in 600 parts by weight of 1-methyl-2-pyrrolidone by heating to 40° C. On cooling to 25° C., 44.2 parts by weight of 2-sulphobenzoic acid cyclic anhydride and 2.5 parts by weight of sodium carbonate were then added, and the mixture was maintained for 3 hours at 25° C., while stirring.

To the above reaction mixture were then added 18.1 parts by weight of octadecyl isocyanate and 0.2 parts by weight of dibutyl tin dilaurate. The reaction mixture was then maintained for 24 hours at 25° C., while stirring. A quantitative IR spectrum undertaken at this point showed that the isocyanate reaction had gone to completion. Unlike Example 1, only a small amount of white precipitate formed at this stage. Nonetheless, the reaction mixture was still filtered and the clear solution was poured into 8,000 parts by weight of vigorously stirred water. The resultant solid was collected on a filter, washed with water in a commercial food processor and dried in vacuo to constant weight to yield 69 parts by weight of a white fibrous solid. Subsequent analysis of this product showed it to have an AV of 38 and a nitrogen content of 1.06%.

50 Parts by weight of the above isocyanate modified polysulphonate were slurried in 500 parts by weight of industrial methylated spirit at ambient temperature. To this slurry were added 16.3 parts by weight of benzyldimethyltetradecylammonium chloride dihydrate, and stirring at ambient temperature for 2 hours a clear solution was obtained. This clear solution was then poured into 8,000 parts by weight of vigorously stirred water and the resultant product was collected on a filter, washed with water in a commercial food processor and dried in vacuo to constant weight. The yield of white fibrous solid was 2 parts by weight.

Analysis showed polymer bound counter-ion to be 7.3% w/w and free counter-ion to be less than 0.1% w/w.

EXAMPLE 4

The counter ion containing polymer of Example 1 and a diazo resin as detailed in example 1 of EP 0030862, were dissolved in ethylene glycol monomethyl ether to give a total solids content of 2.55 pbw in 100 pbw solvent. Various ratios of polysulphonate binder resin:diazo resin were used as indicated in Table 1.

For comparison purposes, a second series of solutions was prepared but this time a non alkylurethane containing polysulphonate binder resin, corresponding to the polymer of Example 1 of British patent application No. 8820547.1, was used. All other properties of the resin were identical e.g. acid value, type and level of counter ion. The resulting solutions from both resins were stored in a dark cupboard at ambient temperatures for 5 days and thereafter examined for clarity.

The results are displayed in Table 1.

TABLE 1

| Coating Solution Appearance After 5 Days. | | | | | |
|---|---|---|---|---|---|
| Alkylurethane | | AV (as | % Binder resin (out of total solids) | | |
| Type | mol % | free acid) | 27 | 50 | 60 | 67 |
| Octadecyl | ~10 | 46 | Clear | Clear | Clear | Clear |
| — | — | 46 | Cloudy | Cloudy | Clear | Clear |

EXAMPLES 5 TO 17

The procedure of Example 4 was repeated for a series of polysulphonate resins having different acid values, and where appropriate, alternative alkyl urethane groups, (indicated in Table 2 by carbon chain length). The polysulphonate resins were prepared in a manner analogous to that detailed in Examples 1–3, using the relevant alkyl isocyanate. The diazo resins used were:

a) the diazo resin detailed in example 1 of EP 0030862 (labelled I) or b) a resin derived from the reaction of 4-diazonium diphenylamine bisulphate salt with formaldehyde and isolated as the p-toluene sulphonate salt, (labelled II).

The results of the coating solution appearance after 5 days ambient storage are shown in Table 2.

TABLE 2

| Example | Diazo | Alkyl urethane Type | mol % | AV (as free acid) | % Binder resin (out of total solids) | | | |
|---|---|---|---|---|---|---|---|---|
| | | | | | 27 | 50 | 60 | 67 |
| 5 | I | $C_{18}$ | 10 | 50 | Clear | Clear | Clear | Clear |
| 6 | I | $C_{18}$ | 10 | 57 | Clear | Clear | Clear | Clear |
| 7 | I | — | — | 51 | Precipitate | Cloudy | Cloudy | Clear |
| 8 | I | — | — | 56 | Precipitate | Precipitate | Precipitate | Cloudy |
| 9 | I | $C_{18}$ | 18 | 52 | Clear | Clear | Clear | Clear |
| 10 | I | $C_{18}$ | 18 | 58 | Clear | Clear | Clear | Clear |
| 11 | II | $C_{18}$ | 10 | 48 | Precipitate | Cloudy | Clear | Clear |
| 12 | II | $C_{18}$ | 10 | 51 | Precipitate | Cloudy | Cloudy | Clear |
| 13 | II | $C_{18}$ | 18 | 55 | Cloudy | Clear | Clear | Clear |

TABLE 2-continued

| Example | Diazo | Alkyl urethane Type | Alkyl urethane mol % | AV (as free acid) | % Binder resin (out of total solids) 27 | 50 | 60 | 67 |
| --- | --- | --- | --- | --- | --- | --- | --- | --- |
| 14 | II | — | — | 46 | Precipitate | Precipitate | Precipitate | Cloudy |
| 15 | II | — | — | 51 | Precipitate | Precipitate | Precipitate | Precipitate |
| 16 | I | $C_{20}$ | 14 | 54 | Clear | Clear | Clear | Clear |
| 17 | I | $C_{12}$ | 19 | 51 | Cloudy | Clear | Clear | Clear |

The examples clearly demonstrate the improved diazo compatibility of the alkyl urethane modified polysulfphonate binder resins.

EXAMPLE 18

To each of the four coating solutions produced in Example 7 (no alkyl urethane) was added 0.1 pwb of a blue dye, Victoria Blue B. After filtering, the solutions containing 27%, 50%, 60% and 67% w/w binder resin were whriler coated onto sheets of electrochemically grained and anodised aluminium, and dried to form radiation sensitive plates A, B, C and D respectively. The same procedure was adopted for the coating solutions produced in Example 9 at 27%, 50%, 60 and 67% w/w binder to give plates E, F, G, and H respectively.

All the plates were then imagewise exposed and developed with an aqueous developer containing both 10% w/v anionic surfactant and 15% w/v non-ionic surfactants and adjusted to pH 7.5. Plate A was found to seriously overdevelop and left a very weak image which could easily be removed by rubbing with a finger. Plates B to H all developed cleanly and quickly to leave a good strong visible image. Plates B to H were then mounted on a proofing press and monitored for ink acceptance. Plates E to H were all fully inked after 4 passes of the inking rollers, whilst plates B to C took 10 passes and plate D had still not become fully inked after 15 passes. These results indicate a greater oleophilicity for the alkyl uretane containing binder resins, but not at the expense of developability.

COMPARATIVE EXAMPLE 1

A solid polysulphonate was prepared from poly(vinyl butyral) and 2l-sulphobenzoic acid cyclic anhydride as in Example 1. 50 parts by weight of this material (AV=46) were taken and dissolved in 500 parts by weight of 1-methyl-2-pyrrolidone by heating to 40° C. On cooling to 25° C., 9.5 parts by weight of pyridine were added followed by a solution prepared from 30 parts by weight of 1-methyl-2-pyrolidone and 30.3 parts by weight of stearoyl chloride. This solution was added over 1 hour and that reaction mixture was maintained at 25° C. for a further 12 hours. The clear solution was then poured into 10,000 parts by weight of vigorously stirred water, collected on a filter, washed with water in a commercial food processor and dried in vacuo to constant weight.

Analysis of this slightly sticky solid showed that it contained 12% w/w free stearic acid.

COMPARATIVE EXAMPLE 2

A solid polysulphonate was prepared from poly(vinyl butyral) and 2-sulphobenzoic acid cyclic anhydride as in Example 1. 50 Parts by weight of this material (AV=46) were taken and dissolved in 500 parts by weight of 1-methyl-2-pyrrolidone by heating to 40° C. On cooling to 25° C., 4.8 parts by weight of sodium hydroxide and 32.5 parts by weight of 1-hexadecanesulphonyl chloride were added. The mixture was then maintained at 25° C. for 48 hours. The mixture was then filtered to remove insolubles and the resultant clear solution was added slowly to 8,000 parts by weight of vigorously stirred water containing 80 parts by weight of concentrated hydrochloric acid. After a small amount of the reaction mixture had been added to the aqueous medium, a large amount of foaming occurred in the latter. This foaming occurred to such an extent that the isolation could not be completed.

EXAMPLE 19

Poly(vinyl butyral) comprising 71wt% vinyl butyral units, 26 wt% vinyl alcohol units and 3% vinyl acetate units and having weight average molecular weight of 45,000 to 50,000 was modified by a procedure analogous to that of Example 1 to yield a polysulphonate polymer of AV47 and octadecyl urethane modification of 8 mol%.

EXAMPLE 20

A solution in ethylene glycol monomethyl ether comprising:
  2.5 parts by weight of the diazo compound detailed in Example 1 of EP 0030862,
  1 parts by weight of the polymer of Example 19,
  0.1 parts of weight of Victoria Blue B, was prepared.

The solution was stored in the dark for 5 days after which visual examination showed the solution to be clear and free of precipitated material. The solution was whriler coated onto a sheet of electrochemically grained and anodised aluminium and dried to form a radiation-sensitive plate of coating weight 0.8 gm$^{-2}$. The plate was image-wise exposed through a continuous tone stouffer step wedge to UV light (650 mJcm$^{-2}$) on a printing-down frame and developed using the developer described in Example 18. The developed plate had a strong, oleophilic image with a step-wedge reading of solid 5, tail 9.

EXAMPLE 21

Example 19 was repeated using poly(vinyl butyral) comprising 80 wt% vinyl butyral units, 19% vinyl alcohol units and 1% vinyl acetate units and having weight average molecular weight of 30,000 to 34,000. The resultant polymer had an octadecyluretane modification of 10 mol% and an AV of 42.

EXAMPLE 22

Example 20 was repeated using (A) the polysulphonate of Example 1 and (B) the polysulphonate of Example 21 in place of the polysulphonate of Example 19. Solutions A and B showed no precipitation or cloudiness after 5 days dark room storage.

Fresh solutions correspondnig to A and B and a further solution (C), which incorporated as binder the non-alkyl urethane polysulphonate described previously in Example 4 were prepared, with which radiation-sensitive plates A, B and C respectively were whirler coated. The plates A, B and C were image-wise exposed to ultraviolet light and processed to provide lithographic plates with Stouffer step-wedge readings of solid 5. These plates were mounted on a web offset press operating with magenta heat-set ink. At 80,000 impressions plate C become 'blind', failing to charge with sufficient ink to provide acceptable printed copy. Plates A and B provided 135,000 copies before showing early signs of image wear but still providing prints of acceptable ink density.

EXAMPLE 23

Example 1 was repeated using the following cations to provide counter-ions in place of benzyldimethyltetradecylammonium chloride.

A) Benzyldimethylhexadecylammonium
B) Trimethylammoniumethyl methacrylate
C) Methyltriphenyl phosphonium
D) Basic Violet 11:1

Printing plates were prepared using each of these polysulphonate resins in place of the polysulphonate of Example 19 using the procedure detailed in Example 20. Each plate gave highly oleophilic images and excellent resistance to blinding on offset press testing to 120,000 copies.

A plate similarly derived using polysulphonate resin D, but with Victoria Blue B shading dye omitted, gave a strong visible red violet image on development.

EXAMPLE 24

4 Parts by weight of the alkyl urethane polysulphonate acid polymer of Example 1, isolated before counter-ion exchange with benzyldimethyltetradecylammonium chloride, was dispersed in 200 parts by weight of ethylene glycol monomethyl ether. 0.012 Parts by weight of benzyldimethyldodecylammonium chloride were added to the dispersion, which, after stirring for 30 minutes, formed a clear solution of the polysulphonate.

2 Parts by weight of the diazo compound described in Example 20 and 0.2 parts by weight of Victoria Blue B were added to this solution.

The resultant solution was stored for 5 days without precipitation of components and was used to prepare a radiation-sensitive plate as described in Example 20. The plate showed rapid development after exposure and gave excellent image oleophilicity and blinding resistance when tested with heat-set ink on an offset press.

EXAMPLE 25

A polysulphonic acid resin was prepared by modification of DP6-3095, a hydroxyacrylic polymer (Allied Colloids) of hydroxy value 155, with 2-sulphobenzoic acid cyclic anhydride as described in Example 24 of British Patent Application No. 8820547. The resultant polymer, of AV 35.2, was modified by reaction with octadecylisocyanate and counter-ion exchanged with benzyldimethyltetradecylammonium chloride by procedures analagous to those described in Example 1 to yield a product with alkyl urethane modification of 12 mol%.

EXAMPLE 26

Solutions in 1:1 methylethyl ketone/ethylene glycol monomethyl ether comprising:

2 parts by weight of the urethane acrylate disclosed in Prepolymer A in Example 1 of U.S. Pat. Application 07-96893,
1 Part by weight of the polysulphonate compound indicated below and
0.15 parts by weight of 2-(4'-trichloromethylphenacylidene)1,3,3-trimethyl-5-chloroindoline
were used to prepare radiation sensitive plates of coating weight 1.2 gm$^{-2}$ according to the procedure described in Example 20.

After whirler coating, the coated plates were overcoated with an aqueous solution of poly(vinyl alcohol) which was then dried to form a barrier layer, of coating weight 1.0 gm$^{-2}$ to prevent oxygen inhibition. After exposure the plates were developed in an aqueous solution, adjusted to pH 10.5, comprising:
anionic surfactant 2%
non-ionic surfactant 7.5%.

Exposure requirements to give a Stouffer solid step 5 are also indicated below:

| Example | Polysulphonate Resin | Exposure for Solid 5/mJcm$^{-2}$ |
|---|---|---|
| 26A | Example 1 | 45 |
| 26B | Example 1 of British Patent Application No. 8820547.1 | 55 |
| 26C | Example 25 | 65 |
| 26D | Example 23B | 35 |

The plates were then mounted on a proofing press and monitored for ink acceptance. Plates A,C and D became fully charged with ink after 7 passes of the inking rollers whilst plate B took 11 passes.

EXAMPLE 27

A solution in 1-methoxy-2-propanol comprising: 1.5 parts by weight of pentaerythritoltetraacrylate, 1.5 parts by weight of the polysulphonate of Example 1, 0.5 parts by weight of the diazo resin described in

EXAMPLE 4, 0.15 parts by weight of 2-(4'trichloromethylphenacylidene)-1,3,3-trimethyl-5-chloroindoline was used to prepare a radiationsensitive plate as described in Example 20. The coating solution remained clear and free of any precipitate over a period of 5 days darkroom storage. On UV exposure to 250mJcm$^{-2}$ on a printing down frame, and processing in the developer described in Example 18, rapid development occurred to give a highly oleophilic image and a step-wedge reading of solid 5, tail 11.

We claim:

1. A polymeric compound derived from a polyhydric material which compound comprises a plurality of substituent sulphonate groups attached to carbon atoms of the polyhydric material and a plurality of substituent urethane groups of the formula

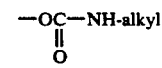

attached to carbon atoms of the polyhydric material.

2. A compound as claimed in claim 1 wherein sulphonate groups are of the formula:

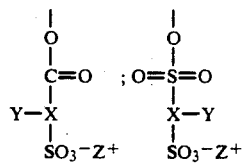

where X is an aliphatic, aromatic, carbocyclic or heterocyclic group; Y is hydrogen, halogen, or an alkyl, aryl, alkoxy, aryloxy or aralkyl group, $CO_2-Z^+$, $CO_2R$ or $SO_3-Z^+$; $Z^+$ is a cationic counter-ion and R is hydrogen or an alkyl, alkylene, aryl or aralkyl group.

3. A compound as claimed in claim 2 wherein the sulphonate groups are derived from sulphonato substituted acids of the formula

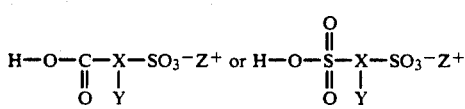

where X, Y, $Z^+$ and R have the meanings specified in claim 2.

4. A compound as claimed in claim 1, wherein the sulphonate groups are derived from a reactive derivative of a carboxylic or sulphonic acid.

5. A compound as claimed in claim 4 wherein the reactive derivative of the carboxylic or sulphonic acid is an anhydride or acid chloride.

6. A compound as claimed in claim 1 wherein the urethane groups are provided by reacting the polyhydric material with an alkyl isocyanate.

7. A compound as claimed in claim 6 wherein the alkyl isocyanate has the formula R'NCO where R' is an alkyl chain comprising from 10 to 20 carbon atoms.

8. A compound as claimed in claim 1 wherein the compound comprises two or more different counter-ion species.

9. A compound as claimed in claim 8 wherein at least one of the counter ion species is radiation sensitive.

10. A compound as claimed in claim 1 wherein the molecular weight of the polymeric compound is in the range of from 900 to 200,000.

11. A compound as claimed in claim 1 wherein the acid value or acid value equivalence of the polymeric compound is in the range of from 5 to 150.

12. A process for the production of a polymeric compound which process comprises reacting some hydroxy groups of a polyhydric material with a sulphonato substituted acid of the formula

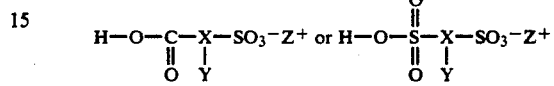

or with an ester forming derivative thereof and reacting other hydroxy groups of the polyhydric material with an alkyl isocyanate of the formula R'NCO to obtain the desired polymeric compound which comprises substituent sulphonate groups of the general formula

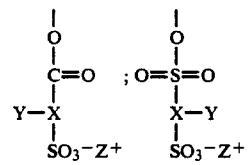

and substituent urethane groups of the formula

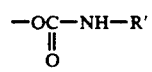

where X, Y, $Z^+$ and R have the meanings specified in claim 1 and R' has the meaning specified in claim 7.

13. A process as claimed in claim 12 wherein the initial counter-ion species is exchanged for a final counter-ion species by means of an ion-exchange process.

* * * * *

UNITED STATES PATENT AND TRADEMARK OFFICE
CERTIFICATE OF CORRECTION

PATENT NO. : 5,162,431

DATED : November 10, 1992

INVENTOR(S) : Rodney M. Potts et al

It is certified that error appears in the above-identified patent and that said Letters Patent is hereby corrected as shown below:

Column 3, line 36, "urethaneforming" should be -- urethane forming --

Column 10, line 7, "7.3%" should be -- 17.3% --

Column 11, line 45, "21-sulphobenzoic" should be -- 2-sulphobenzoic --

Column 14, lines 7-8, "2-(4'-trichloromethylphenacylidene)1" should be -- 2-(4'-trichloromethylphenacylidene)-1 --

Column 14, line 46, "radiationsensitive" should be -- radiation sensitive --

Signed and Sealed this

Twenty-second Day of February, 1994

Attest:

BRUCE LEHMAN

Attesting Officer    Commissioner of Patents and Trademarks